(12) United States Patent
Takahashi et al.

(10) Patent No.: US 11,485,415 B2
(45) Date of Patent: Nov. 1, 2022

(54) VEHICLE BODY LOWER STRUCTURE

(71) Applicants: TOYOTA JIDOSHA KABUSHIKI KAISHA, Aichi (JP); SUBARU CORPORATION, Tokyo (JP)

(72) Inventors: Naoki Takahashi, Miyoshi (JP); Shunji Shibata, Anjo (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 33 days.

(21) Appl. No.: 17/135,795

(22) Filed: Dec. 28, 2020

(65) Prior Publication Data

US 2021/0214012 A1 Jul. 15, 2021

(30) Foreign Application Priority Data

Jan. 14, 2020 (JP) .............................. JP2020-003794

(51) Int. Cl.
| | |
|---|---|
| *B60J 7/00* | (2006.01) |
| *B62D 21/15* | (2006.01) |
| *B62D 27/02* | (2006.01) |
| *B62D 25/20* | (2006.01) |

(52) U.S. Cl.
CPC .............. *B62D 21/15* (2013.01); *B62D 25/20* (2013.01); *B62D 27/02* (2013.01)

(58) Field of Classification Search
CPC ................ B62D 21/157; B62D 25/025; B62D 25/2036; B60K 1/04; B60K 2001/0438; A61P 35/00; F02B 1/04; H01L 2224/48091; H01L 2924/00; Y02E 60/10
See application file for complete search history.

(56) References Cited

U.S. PATENT DOCUMENTS

| | | | |
|---|---|---|---|
| 2013/0320713 A1 | 12/2013 | Iwamoto et al. | |
| 2016/0083017 A1* | 3/2016 | Sakaguchi | B62D 25/2036 296/187.12 |
| 2016/0257346 A1* | 9/2016 | Wu | B60K 1/04 |
| 2018/0126933 A1 | 5/2018 | Kawase et al. | |
| 2018/0312198 A1* | 11/2018 | Shimizu | B62D 27/04 |
| 2018/0312199 A1* | 11/2018 | Kawase | B62D 21/157 |
| 2020/0023905 A1* | 1/2020 | Kawase | B62D 25/025 |
| 2020/0391798 A1 | 12/2020 | Ebner et al. | |
| 2021/0070376 A1* | 3/2021 | Takahashi | B62D 25/025 |
| 2021/0078638 A1* | 3/2021 | Hirota | B62D 21/157 |

(Continued)

FOREIGN PATENT DOCUMENTS

| | | |
|---|---|---|
| JP | 2013133046 A | 7/2013 |
| JP | 201875939 A | 5/2018 |

(Continued)

*Primary Examiner* — Kiran B Patel
(74) *Attorney, Agent, or Firm* — Hauptman Ham, LLP

(57) ABSTRACT

A vehicle body lower structure may include: a hollow rocker arranged at a lower lateral part of a vehicle body and extending along a front-rear direction of the vehicle body; a power source arranged adjacent to the rocker; an energy absorbing member connected to the power source and arranged under the rocker; and a collar arranged between the rocker and the energy absorbing member. The rocker may be provided with a flange extending downward from a bottom plate of the rocker. A height of the collar above the energy absorbing member may be greater than a height of the flange.

5 Claims, 6 Drawing Sheets

(56) References Cited

U.S. PATENT DOCUMENTS

| | | |
|---|---|---|
| 2021/0094624 A1* | 4/2021 | Takahashi ............. B60L 3/0007 |
| 2021/0221435 A1* | 7/2021 | Takahashi ........... B62D 25/2036 |
| 2021/0221436 A1 | 7/2021 | Tsuyuzaki et al. |
| 2021/0221441 A1* | 7/2021 | Takahashi ............ B62D 25/025 |
| 2021/0221442 A1* | 7/2021 | Takahashi ............ B62D 27/023 |
| 2021/0284243 A1* | 9/2021 | Takahashi ............ B62D 21/157 |

FOREIGN PATENT DOCUMENTS

| | | |
|---|---|---|
| JP | 2018193026 A | 12/2018 |
| WO | 2012111098 A1 | 8/2012 |
| WO | 2019096675 A1 | 5/2019 |

\* cited by examiner

VEHICLE BODY LOWER STRUCTURE

CROSS-REFERENCE TO RELATED APPLICATION

This application claims priority to Japanese Patent Application No. 2020-003794 filed on Jan. 14, 2020, the contents of which are hereby incorporated by reference into the present application.

TECHNICAL FIELD

The art disclosed herein relates to a vehicle body lower structure. It relates, in particular, to a vehicle body lower structure in which a power source is arranged adjacent to a rocker.

BACKGROUND

In electric vehicles, a power source configured to supply power to a traction motor may be arranged adjacent to a rocker. The power source may be a battery, a fuel cell, or the like. The rocker is a frame (hollow beam) extending along a front-rear direction of the vehicle body at a lower lateral part of the vehicle body. The rocker may also be referred to as "side sill".

In order to protect the power source from an impact of lateral collision to the lateral part of the vehicle body, a member (energy absorbing member) configured to absorb impact energy caused by lateral collision may be arranged lateral to the power source. Japanese Patent Application Publication Nos. 2013-133046 and 2018-75939 describe examples of such an energy absorbing member. Each of the energy absorbing members extends along a front-rear direction of a vehicle body and is connected to a rocker and a power source. Each of the energy absorbing members is fixed to a bottom plate of its rocker. Hereafter, an energy absorbing member may be referred to as "EA member" for convenience of description.

SUMMARY

A rocker is configured of a rocker inner panel and a rocker outer panel. Each of the rocker inner panel and the rocker outer panel has a flange extending downward (a lower flange) and a flange extending upward (an upper flange). The lower flanges of both the rocker inner panel and the rocker outer panel are joined together and the upper flanges of both the rocker inner panel and the rocker outer panel are joined together. The joined lower flanges extend downward from a bottom plate of the rocker. The EA member described in Japanese Patent Application Publication No. 2013-133046 is arranged only in an area closer to a center of the vehicle body than the lower flanges. Such a structure makes it difficult to secure a sufficient width of the EA member, and thus the EA member may not absorb collision energy sufficiently. In the structure described in Japanese Patent Application Publication No. 2018-75939, two EA members are arranged to interpose the lower flanges therebetween. Such a structure in which EA members are arranged on both sides of lower flanges has to be complex. The present disclosure provides a vehicle body lower structure which allows employment of a simple EA member with sufficient width to a rocker including a lower flange.

A vehicle body lower structure disclosed herein may comprise: a hollow rocker arranged at a lower lateral part of a vehicle body and extending along a front-rear direction of the vehicle body; a power source arranged adjacent to the rocker; an energy absorbing member connected to the power source and arranged under the rocker; and a collar arranged between the rocker and the energy absorbing member. The rocker may be provided with a flange extending downward from a bottom plate of the rocker. A height of the collar above the energy absorbing member may be greater than a height of the flange.

The vehicle body lower structure disclosed herein enables the EA member to be fixed to the rocker under the lower flange by the collar being arranged between the bottom plate of the rocker and the EA member. The vehicle body lower structure disclosed herein can employ an EA member with simple structure because the EA member is arranged below the lower flange.

One aspect of the collar may have the following features. The collar penetrates an upper plate of the EA member. An upper end of the collar is in contact with the bottom plate of the rocker and a lower end of the collar is in contact with a lower plate of the EA member. The rocker and the EA member are joined together with a bolt passing through the collar. These features enable the rocker, the EA member, and the collar to be fixed to each other with the single bolt.

The vehicle body lower structure disclosed herein may further comprise a support plate extending from the power source, and the support plate and the energy absorbing member may be joined together with a bolt passing through the collar. These features enable the rocker, the EA member, the support plate (the power source), and the collar to be fixed each other with the single bolt.

The EA member may include a first EA member and a second EA member. The second EA member may be arranged between the first EA member and the power source. The first EA member, the second EA member, and the support plate may be joined together with an additional bolt. The EA member may be divided to the first EA member which is fixed to the rocker and the second EA member which is arranged on a power source side. These features enable the single power source to be incorporated into a variety of vehicle bodies having different body widths simply by exchanging the first EA member.

Details and further developments of the art disclosed herein will e described in DETAILED DESCRIPTION as below.

DETAILED DESCRIPTION

Embodiment

Figure 1:
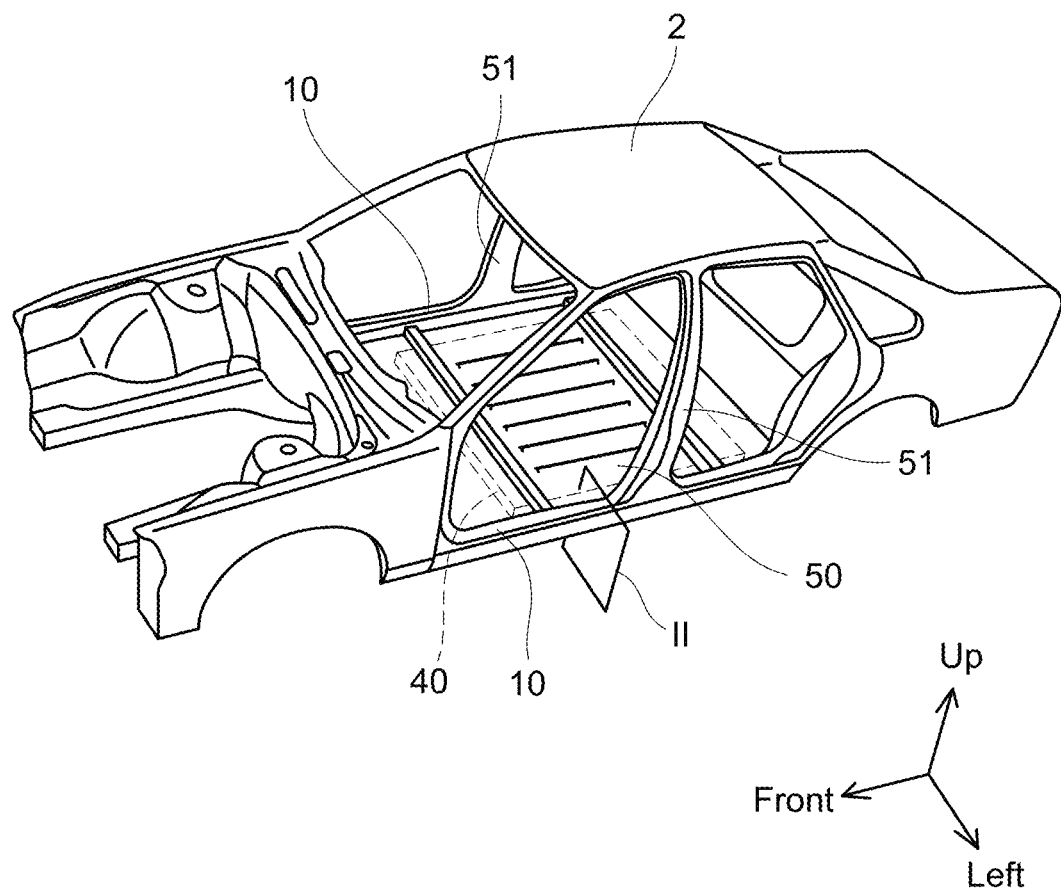
FIG. 1 is a perspective view of a vehicle body.

A vehicle body lower structure 3 according to an embodiment will be described with reference to the drawings. FIG. 1 illustrates a perspective view of a vehicle body 2. In the coordinate system of FIG. 1, "Left" indicates "left" when the vehicle body is viewed from the rear toward the front. The "Left" in the coordinate system has the same meaning in all of the drawings.

The vehicle body 2 comprises a pair of rockers 10. The rockers 10 are arranged respectively at lower lateral parts of the vehicle body 2 in a vehicle-width (left-right) direction. Each rocker 10 has an elongated shape and extends along a front-rear direction of the vehicle body 2. Lower ends of center pillars 51 are connected respectively to the rockers 10 at vicinities of centers of the rockers 10 in a longitudinal direction of the rockers 10. The pair of rockers 10 and the center pillars 51 are one type of frame configured to secure rigidity of the vehicle body 2. Each of the rockers 10 is formed by press working operation for a metal plate (typically, a steel plate).

A battery pack 40 and a floor panel 50 are arranged between the pair of rockers 10. In other words, the battery pack 40 and the floor panel 50 are arranged adjacent to each of the rockers 10. The battery pack 40 includes a large number of battery cells therein. The battery cells are connected in series and configured to output high-voltage power. The battery pack 40 (the plurality of battery cells) is configured to supply the power to an electric traction motor (not shown).

The floor panel 50 corresponds to a floor of a cabin. Ends of the floor panel 50 in the vehicle-width direction are fixed respectively to the rockers 10. The battery pack 40 is arranged under the floor panel 50. Although details will be described later, energy absorbing members (not shown in FIG. 1) are arranged respectively along the rockers 10, and the battery pack 40 is supported by the pair of rockers 10 via the energy absorbing members. The battery pack 40 may be supported by the rockers 10 via the floor panel 50 as well as via the energy absorbing members.

The energy absorbing members are arranged on both sides of the battery pack 40 in the vehicle-width direction. Hereafter, the energy absorbing member(s) will be referred to as EA member(s) for convenience of description.

Figure 2:
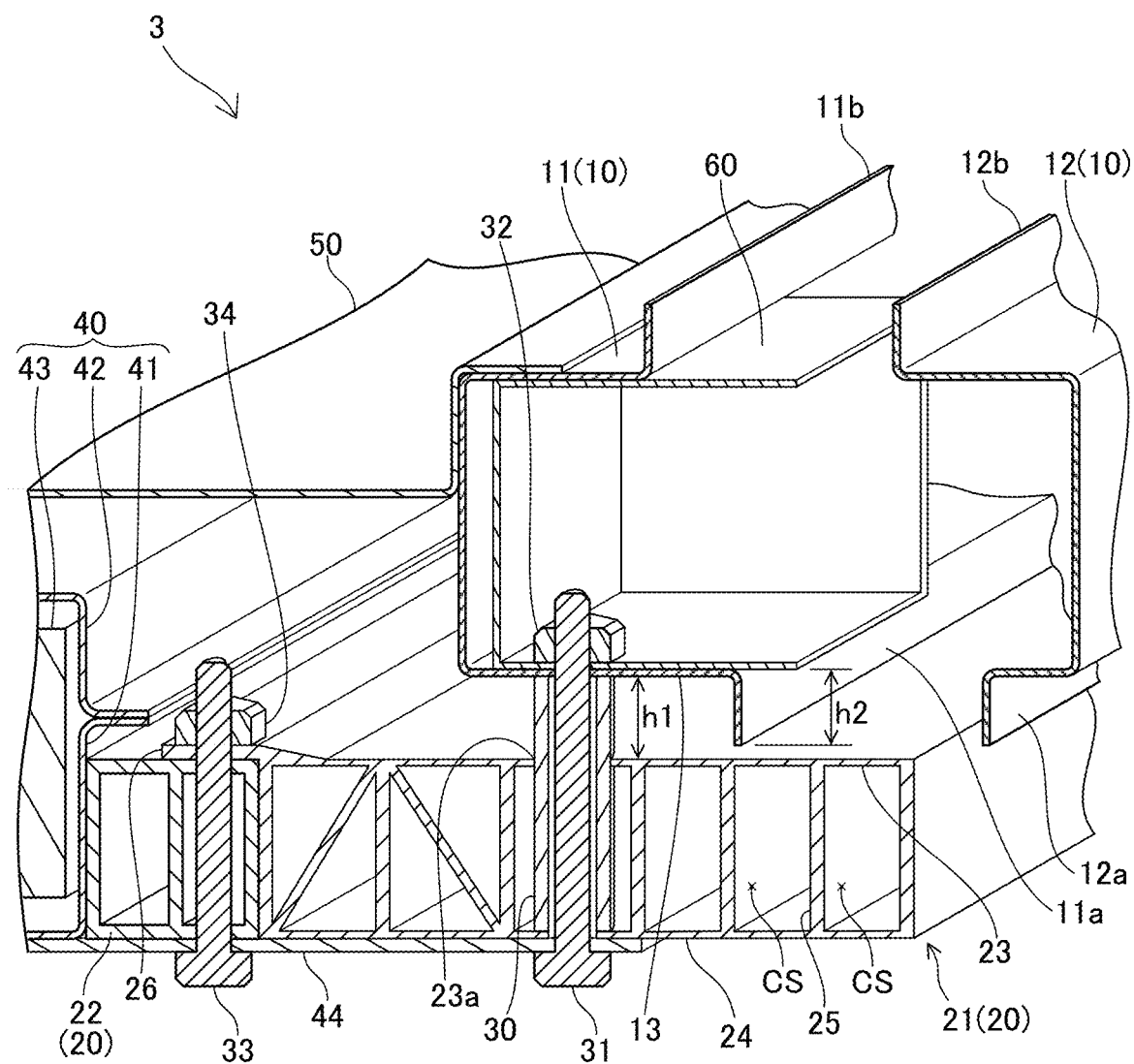
FIG. 2 is a cross-sectional view of the vehicle body cut along a plane II of FIG. 1.

FIG. 2 shows a cross section of the vehicle body 2 cut along a plane II in FIG. 1. FIG. 2 shows a left part of the lower structure 3 of the vehicle body 2. As aforementioned, the battery pack 40 is fixed to the rockers 10 via the EA members 20 (energy absorbing members 20) at lower right and lower left parts of the vehicle body 2. The left part of the lower structure 3 of the vehicle body 2 will be described hereinafter. The vehicle body 2 is symmetrical with respect to the left-right direction, thus the right part of the lower structure 3 of the vehicle body 2 has the same structure as that of FIG. 2. That is, the vehicle body lower structure 3 of the embodiment comprises the pair of rockers 10 and the pair of EA members 20, and each of the EA members 20 is arranged along corresponding one of the pair of rockers 10. Hereinafter, one of the rockers 10 that is arranged at the left part of the vehicle body 2 (left rocker 10) and one of the EA members 20 that is fixed to this rocker 10 will be described.

The battery pack 40 comprises a lower cover 41, an upper cover 42, and a plurality of battery cells 43. A container is configured by the lower cover 41 and the upper cover 42, and the plurality of battery cells 43 is housed within the container. Each of the lower cover 41 and the upper cover 42 is provided with a flange, and the container is configured by the flanges of the lower cover 41 and the upper cover 42 being joined.

The rocker 10 is configured of a rocker inner panel 11 and a rocker outer panel 12. The rocker inner panel 11 has a square U shape (a channel shape) and is disposed with the U shape lying down on its side. The rocker inner panel 11 includes a lower flange 11a and an upper flange 11b. The lower flange 11a extends downward from a lower edge of the lying U shape of the rocker inner panel 11. The upper flange 11b extends upward from an upper edge of the lying U shape of the rocker inner panel 11. The rocker outer panel 12 has the same shape as the rocker inner panel 11. The rocker outer panel 12 includes a lower flange 12a and an upper flange 12b, and the lower flange 12a and the upper flange 12b face the lower flange 11a and the upper flange 11b of the rocker inner panel 11, respectively. The lower flanges 11a and 12a are welded to each other and the upper flanges 11b and 12b are welded to each other, which results in the rocker 10 having a hollow rectangular tube shape. In FIG. 2, the rocker outer panel 12 is depicted apart from the rocker inner panel 11 to help understanding.

A bulkhead 60 is arranged in the rocker 10. The bulkhead 60 is a reinforcement member for enhancing strength of the rocker 10. The bulkhead 60 is attached to inside of the rocker inner panel 11 before the rocker inner panel 11 and rocker outer panel 12 are joined to each other. The bulkhead 60 is fixed to the rocker inner panel 11 by welding or with a bolt (not shown). A nut 32 is fixed to inside of the bulkhead 60 by welding. The bulkhead 60 will be described later.

The EA member 20 is configured of a first EA member 21 and a second EA member 22. The first EA member 21 is arranged under the rocker 10. The second EA member 22 is arranged between the first EA member 21 and the battery pack 40. The first EA member 21 is fixed to the rocker 10. The second EA member 22 is connected to the first EA member 21 and also connected to the battery pack 40.

The EA member 20 (each of the first EA member 21 and the second EA member 22) has a hollow rectangular tube shape. In other words, the EA member 20 (each of the first EA member 21 and the second EA member 22) is a hollow beam. The EA member 20 is configured to absorb collision energy caused by a lateral collision to the vehicle to protect the battery pack 40. The EA member 20 is configured to absorb the collision energy by being crushed in the vehicle-width direction by an impact of the collision. The rocker 10 also contributes to absorption of the collision energy, however, the rocker 10 alone may be insufficient to absorb all the collision energy on its own. To address this, the hollow EA member 20 is arranged along the rocker 10.

Strength of the EA member 20 is determined in advance, for example, by simulation such that the EA member 20 can effectively absorb the collision energy. An inner space of the first EA member 21 is partitioned into several cell spaces CS by a plurality of partition plates 25 which connects an upper plate 23 and a lower plate 24 of the first EA member 21 to each other. The strength of the EA member 20 can be adjusted by appropriately selecting the number and/or thicknesses of the partition plates 25. The strength of the EA member 20 is set lower than at least strength of the battery pack 40.

As aforementioned, the first EA member 21 is arranged under the rocker 10. Meanwhile, the rocker 10 is provided with the lower flange 11a (12a) extending downward from a bottom plate 13 of the rocker 10. The first EA member 21 needs to be arranged such that it can avoid interference with the lower flange 11a (12a). If the first EA member 21 is divided into an inner portion and an outer portion relative to the lower flange 11a (12a), the structure of the EA member thereby becomes complex. It should be noted that the "inner portion relative to the lower flange 11a (12a)" means a portion of the first EA member 21 that is closer to a vehicle center than the lower flange 11a (12a) in the vehicle-width direction. Similarly, the "outer portion relative to the lower flange 11a (12a)" means a portion of the first EA member 21 that is farther from the vehicle center than the lower flange 11a (12a) in the vehicle-width direction.

In the vehicle body lower structure 3 of the embodiment, the interference between the first EA member 21 and the lower flange 11a (12a) can be avoided by a collar 30 being arranged between the first EA member 21 and the rocker 10. Placing the first EA member 21 under the lower flange 11a (12a) allows the first EA member 21 to have a simple shape and extend to a position that is on outer side relative to the lower flange 11a (12a) in a vehicle-width direction.

The collar 30 is a metal cylinder. In other words, the collar 30 is a spacer configured to secure a clearance between the rocker 10 and the first EA member 21. As shown in FIG. 2, a height h1 of the collar 30 above the first EA member 21 is greater than a height h2 of the lower flange 11a (12a). The collar 30 secures a clearance of distance h1 between the bottom plate 13 of the rocker 10 and the upper plate 23 of the first EA member 21. Because the height of the lower flange 11a (12a) is h2 (<h1), the lower flange 11a (12a) does not interfere with the first EA member 21. Thus, a simple rectangular tube shape can be employed as the shape of the first EA member 21, manufacturing costs for the EA member 21 can thereby be reduced.

A structure around the collar 30 will be described. The collar 30 passes through a hole 23a provided in the upper plate 23 of the first EA member 21. An upper end of the collar 30 is in contact with a lower surface of the bottom plate 13 of the rocker 10. A lower end of the collar 30 is in contact with an upper surface of the lower plate 24 of the first EA member 21. The first EA member 21, the rocker 10, and the bulkhead 60 are joined together and fixed to each other with a bolt 31 passing through the collar 30 and the nut 32.

When the battery pack 40 vibrates up and down while the vehicle is running, the collar 30 also vibrates up and down, and thus a vibration load is applied to the rocker 10 in an up-down direction. A deformation of the rocker 10 caused by the vibration load applied from the collar 30 is small because the bulkhead 60 and the bottom plate 13 are arranged between the collar 30 and the nut 32.

A support plate 44 extends outward from a lower surface of the battery pack 40 in the vehicle-width direction. The support plate 44 and the first EA member 21 are also joined together and fixed to each other with the bolt 31 and the nut 32. The battery pack 40 can be fixed to the EA member 20 firmly by fixing the support plate 44 extending from the battery pack 40 to the first EA member 21.

A connecting structure of the first EA member 21 and the second EA member 22 will be described. A flange 26 extends from an end of the upper plate 23 of the first EA member 21 towards the vehicle center in the vehicle-width direction. The second EA member 22 is fixed to the flange 26 of the first EA member 21 with a bolt 33 and a nut 34. The support plate 44 extending from the battery pack 40 is also fixed to the second EA member 22 with the bolt 33. The second EA member 22 is held and fixed between the flange 26 of the first EA member 21 and the support plate 44 of the battery pack 40. The second EA member 22 is bonded to a side surface of the lower cover 41 of the battery pack 40. The battery pack 40 and the second EA member 22 are fixed firmly to each other with the bolt 33 and adhesive material.

The EA member 20 is divided into the first EA member 21 which is fixed to the rocker 10 and the second EA member 22 which is bonded to the battery pack 40. The second EA member 22 is detachable from the first EA member 21. The EA member 20 can be applied to a variety of vehicles having different body widths by selecting a second EA member having an appropriate width from among a variety of second EA members 22 having different widths and combining the selected second EA member 22 with the first EA member 21.

Figure 3:
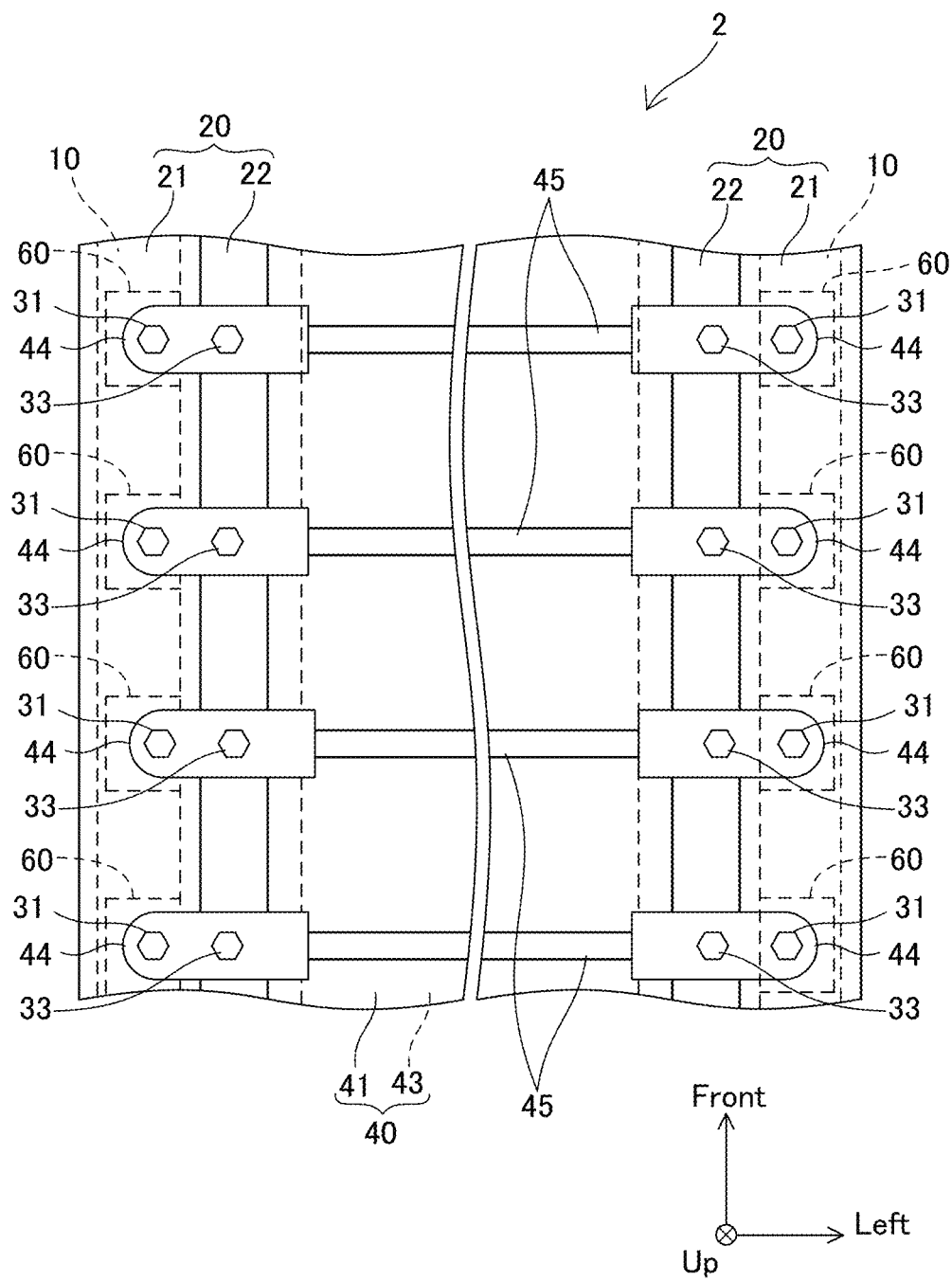
FIG. 3 is a bottom view of the vehicle body.

The bottom view of the vehicle body 2 is shown in FIG. 3. The EA member 20 (the first EA member 21) and the rocker 10 is joined together with the plurality of bolts 31 arranged in the front-rear direction of the vehicle. As shown in FIG. 2, each of the plurality of bolts 31 passes through a corresponding collar 30 and fixes the first EA member 21 to the rocker 10. The EA members 20 (the first EA members 21) and the rockers 10 are connected firmly to each other with a fewer bolts because they are joined together with the bolts. In FIG. 3, the collars 30 are omitted.

A plurality of bulkheads 60 is arranged in each of the rockers 10 along the front-rear direction of the vehicle. Each of the plurality of bulkheads 60 is also joined together with a corresponding EA member 20 (corresponding first EA member 21) with the bolt 31. Each single bolt 31 fixes the EA member 20 (the first EA member 21) to the rocker 10 and also fixes one of the bulkheads 60 to the rocker 10. The structure described above is simple and enable weight reduction as compared to a structure in which the EA member 20 and the bulkheads 60 are separately fixed to the rocker 10.

A plurality of support plates 44 of the battery pack 40 is also arranged along the front-rear direction of the vehicle. Each of the plurality of support plates 44 extends outward from the battery pack 40 in the vehicle-width direction. Each of the support plates 44 is fixed to a corresponding EA member 20 (corresponding first EA member 21 and second EA member 22) with the bolts 31, 33.

Crossmembers 45 extending in the vehicle-width direction are provided on the lower cover 41 of the battery pack 40. The crossmembers 45 are elongated protrusions provided on the lower cover 41. Each of the support plates 44 is connected to an end of a corresponding crossmember 45. The strength of connection between the battery pack 40 and the EA members 20 is enhanced by attaching the support plates 44 to the ends of the crossmembers 45 and fixing the support plates 44 to the EA members 20.

The bulkheads 60 will be described. Each bulkhead 60 is a reinforcement member formed by bending one metal plate. Each bulkhead 60 is also joined together with the corresponding EA member 20 (the corresponding first EA member 21) with the bolt 31. The bulkheads 60 are efficiently fixed by being joined together with the EA members 20.

Figure 4:
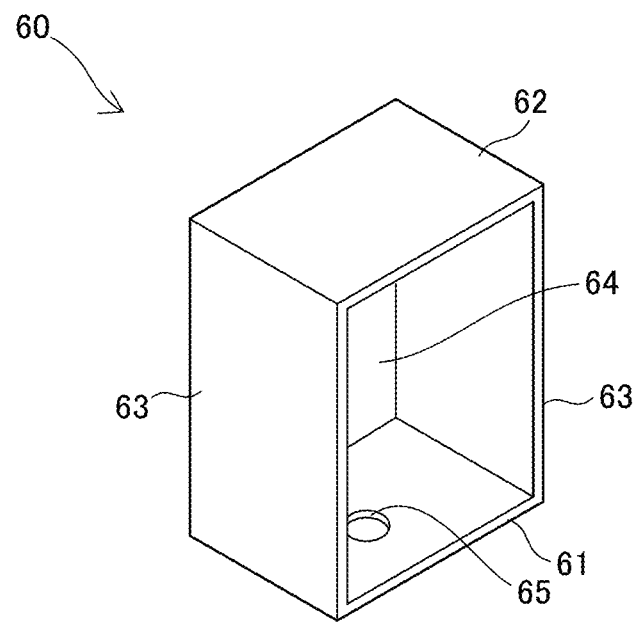
FIG. 4 is a perspective view of a bulkhead.

FIG. 4 shows a perspective view of one bulkhead 60. The bulkhead 60 is configured of a bottom plate 61, a top plate 62, a pair of side plates 63, and a back plate 64. A through hole 65 is provided in the bottom plate 61. The bolt 31 passes through the through hole 65. The nut 32 shown in FIG. 2 is welded to the bottom plate 61 such that a center line of the nut 32 coincides with a center line of the through hole 65. The nut 32 is omitted in FIG. 4.

The bulkhead 60 is attached to the inside of the rocker inner panel 11 before the rocker inner panel 1 and the rocker outer panel 12 are joined to each other to form the rocker 10.

Figure 5:
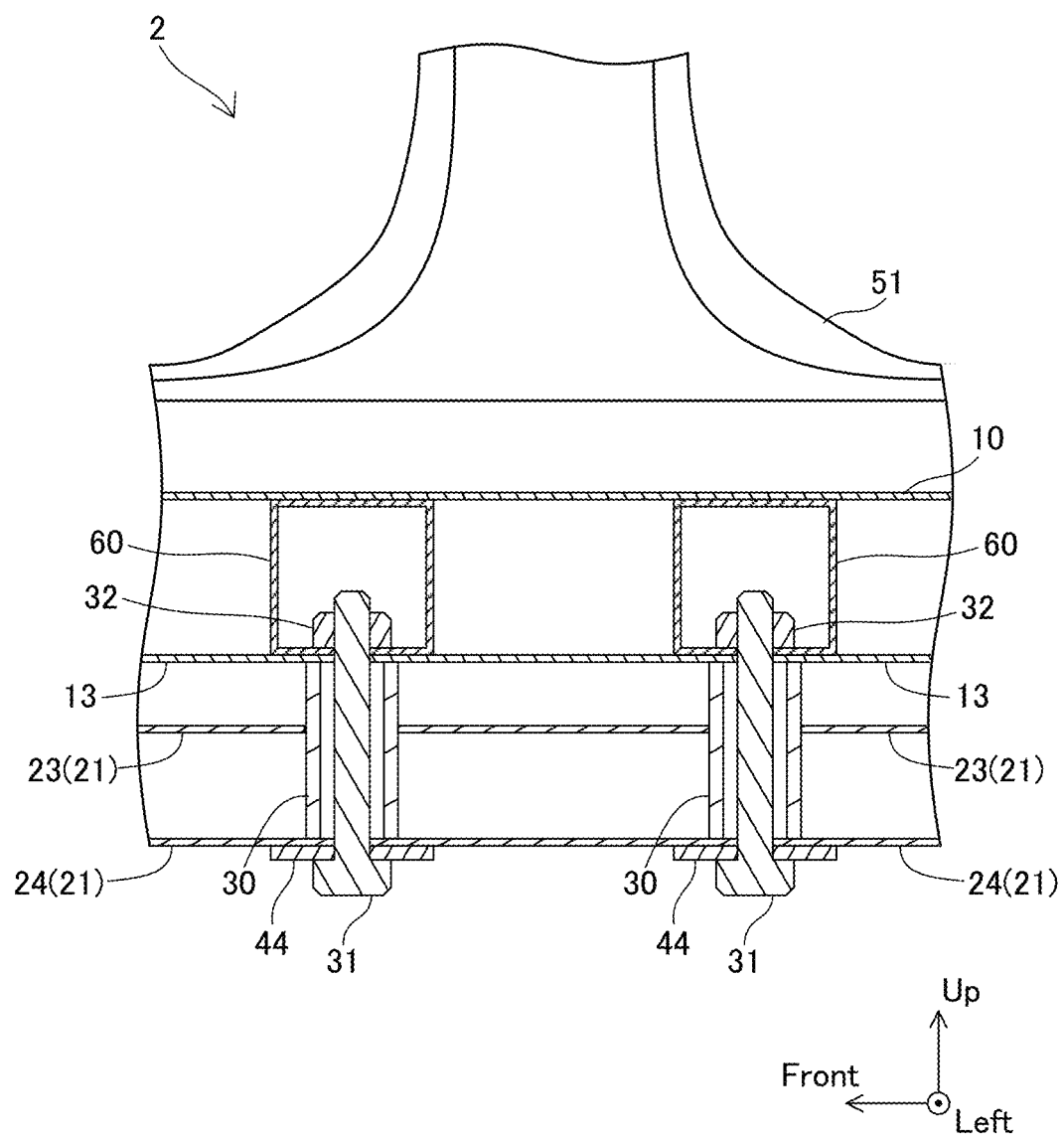
FIG. 5 is a side view of a lower part of a center pillar.

As aforementioned, the plurality of bulkheads 60 is arranged in each of the rockers 10. FIG. 5 shows a side view of the lower part of one center pillar 51 (refer to FIG. 1). FIG. 5 shows cross sections of the rocker 10, the first EA member 21, the collars 30, the support plates 44, and bolts 31. As shown in FIG. 5, the bulkheads 60 are arranged also under the center pillar 51. In other words, at least one of the plurality of bulkheads 60 is arranged to overlap with the center pillar 51 when viewed in the up-down direction. The center pillar 51 is a kind of frame that secures the strength of the vehicle body 2. Especially, the center pillar 51 secures the strength against rollover of the vehicle. The strength against rollover of the vehicle can be improved by arranging at least one bulkhead 60 under the center pillar 51.

Figure 6A:
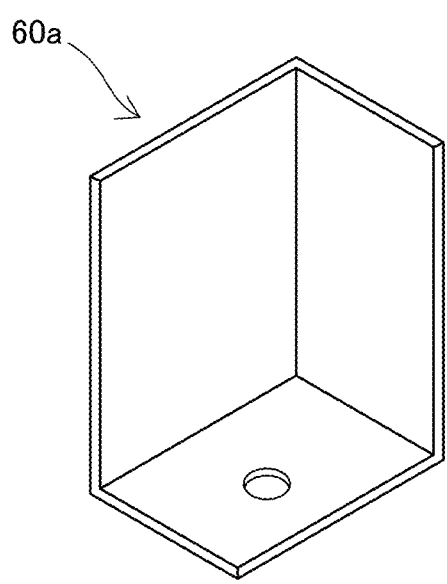
FIGS. 6A to 6C are perspective views of bulkheads according to variants.
Figure 6B:
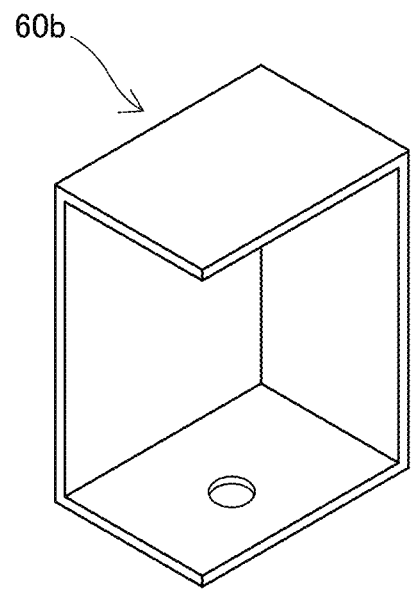
Figure 6C:
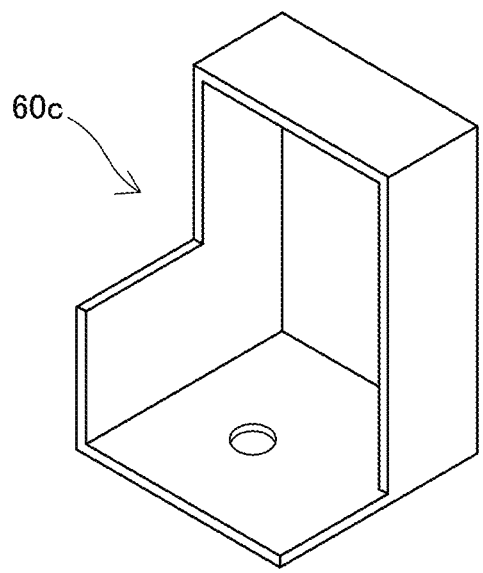

As aforementioned, each bulkhead 60 is formed by bending a metal plate. FIG. 4 is a schematic diagram of one bulkhead 60 and omits details of the shape of the bulkhead 60. The shape shown in FIG. 4 is an example of the shape of the bulkhead 60. The bulkhead 60 may have various shapes such as bulkheads 60a to 60c shown in FIGS. 6A to 6C, for example.

Points to be noted with regard to the art described in the embodiment will be described. Cross sectional shapes of the EA member 20 (the first EA member 21, the second EA member 22) cut along planes perpendicular to the front-rear direction of the vehicle are identical regardless of the cutting positions along the front-rear direction. The EA member 20 (the first EA member 21, the second EA member 22) may be formed by extrusion molding of metal (typically, aluminum).

One bulkhead 60 may be fixed to the rocker 10 with single bolt 31. Or, one bulkhead 60 may be fixed to the rocker 10 with a plurality of bolts. Each of the bolts fixing one bulkhead 60 may pass through corresponding one of the collars 30, and the bolts may fix the EA member 20 to the rocker 10 via the collars 30.

The battery pack 40 is an example of "power source". The battery pack 40 houses the plurality of battery cells. The power source arranged adjacent to the rocker 10 is not limited to the battery pack 40. The power source may be a device housing capacitors or a device housing fuel cells.

Each EA member 20 (each of the first EA members 21 and the second EA members 22) is a hollow beam having a rectangular tube shape. Therefore, "the first EA member" may be called as "the first hollow beam" and "the second EA member" may be called as "the second hollow beam".

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed.

Further, the purpose of the examples illustrated by the present description or drawings is to satisfy multiple objectives simultaneously, and satisfying any one of those objectives gives technical utility to the present disclosure.

What is claimed is:

1. A vehicle body lower structure, comprising:
    a hollow rocker arranged at a lower lateral part of a vehicle body and extending along a front-rear direction of the vehicle body;
    a power source arranged adjacent to the rocker;
    an energy absorbing member connected to the power source and arranged under the rocker; and
    a collar arranged between the rocker and the energy absorbing member,
    wherein
    the rocker is provided with a flange extending downward from a bottom plate of the rocker, and
    a height of the collar above the energy absorbing member is greater than a height of the flange.

2. The vehicle body lower structure of claim 1, wherein
    the collar penetrates an upper plate of the energy absorbing member,
    an upper end of the collar is in contact with the bottom plate of the rocker and a lower end of the collar is in contact with a lower plate of the energy absorbing member, and
    the rocker and the energy absorbing member are joined together with a bolt passing through the collar.

3. The vehicle body lower structure of claim 2, further comprising a support plate extending from the power source,
    wherein the support plate and the energy absorbing member are joined together with the bolt passing through the collar.

4. The vehicle body lower structure of claim 3, wherein
    the energy absorbing member includes a first energy absorbing member and a second energy absorbing member arranged between the first energy absorbing member and the power source, and
    the first energy absorbing member, the second energy absorbing member, and the support plate are joined together with an additional bolt.

5. The vehicle body lower structure of claim 1, wherein the energy absorbing member is a hollow beam.

* * * * *